United States Patent
Liu et al.

(10) Patent No.: US 10,133,102 B1
(45) Date of Patent: Nov. 20, 2018

(54) FAST DETACHABLE PLACEMENT SEAT STRUCTURE FOR DISPLAY

(71) Applicant: EBN Technology Corp., New Taipei (TW)

(72) Inventors: Tze-Yang Liu, New Taipei (TW); Ding-Shiuan Lin, New Taipei (TW); Wei-Shiang Liau, New Taipei (TW)

(73) Assignee: EBN TECHNOLOGY CORP., New Taipei (TW)

( * ) Notice: Subject to any disclaimer, the term of this patent is extended or adjusted under 35 U.S.C. 154(b) by 0 days.

(21) Appl. No.: 15/913,557

(22) Filed: Mar. 6, 2018

(51) Int. Cl.
| *A47B 96/00* | (2006.01) |
| *G02F 1/1333* | (2006.01) |
| *F16M 11/04* | (2006.01) |
| *A47F 9/04* | (2006.01) |
| *B60R 11/02* | (2006.01) |
| *B60R 11/00* | (2006.01) |

(52) U.S. Cl.
CPC ..... *G02F 1/133308* (2013.01); *F16M 11/041* (2013.01); *A47F 9/046* (2013.01); *A47F 2009/041* (2013.01); *B60R 11/0258* (2013.01); *B60R 2011/0078* (2013.01); *F16M 2200/08* (2013.01)

(58) Field of Classification Search
USPC ................................................ 248/221.12
See application file for complete search history.

(56) References Cited

U.S. PATENT DOCUMENTS

| 6,229,584 | B1* | 5/2001 | Chuo | G06F 1/1601 248/917 |
| 6,484,994 | B2* | 11/2002 | Hokugoh | F16M 11/10 248/371 |
| 7,595,978 | B2* | 9/2009 | Chen | F16M 11/10 361/679.06 |
| 7,766,296 | B2* | 8/2010 | Choi | F16M 11/10 248/176.1 |
| 7,804,682 | B2* | 9/2010 | Tseng | F16M 11/105 248/917 |
| 9,338,902 | B2* | 5/2016 | Liu | F16M 11/041 |
| 2003/0075649 | A1* | 4/2003 | Jeong | F16M 11/105 248/157 |
| 2005/0127260 | A1* | 6/2005 | Dittmer | F16M 11/041 248/221.11 |
| 2005/0263671 | A1* | 12/2005 | Lo | F16M 11/10 248/200 |

(Continued)

*Primary Examiner* — Monica E Millner
(74) *Attorney, Agent, or Firm* — Chun-Ming Shih (57) ABSTRACT

A fast detachable placement seat structure for a display, that comprises: a flat panel display and a placement seat. The placement seat includes: a support plate, a bottom seat, a cable placement portion, and a fast detachable mechanism. The fast detachable mechanism includes at least a fastening portion, and at least a locking portion. The flat panel display is disposed in an electronic device. The bottom base is connected to the support plate to form an angle with the support plate, and is used for receiving circuits. The flexible design mentioned able is able to achieve fewer components required, simple structure, easy assembly/detachment, to save time for assembly and repair, and reduce production cost significantly. As such, that fast detachable placement seat structure for a display can be used in various electronic products having flat panel displays.

9 Claims, 6 Drawing Sheets

(56) References Cited

U.S. PATENT DOCUMENTS

| 2007/0097617 | A1* | 5/2007 | Searby | F16M 11/041 |
| | | | | 361/679.4 |
| 2008/0192418 | A1* | 8/2008 | Zambelli | F16M 11/041 |
| | | | | 361/679.02 |
| 2015/0146358 | A1* | 5/2015 | Yu | G06F 1/1601 |
| | | | | 361/679.21 |

* cited by examiner

FAST DETACHABLE PLACEMENT SEAT STRUCTURE FOR DISPLAY

BACKGROUND OF THE INVENTION

Field of the Invention

The present invention relates to a placement seat of a flat panel display used in an electronic device, and in particular to a fast detachable placement seat structure for a display, that is compact in structure, easy to assemble and detach without the need of using tools.

The Prior Arts

In general, the bottom of a flat panel display is provided with a placement seat for support, so that in application, the flat panel display is able to stand upright, to show data and pictures, for the convenient viewing by the spectators. Presently, the flat panel display is used extensively in the various electronic devices, such as industrial control instrument, man-machine interface, Point of Sale, multi-function printer, vehicle GPS, communication device, telephone system, intelligent household equipment, and medical care device.

Presently, along with the progress of the manufacturing Industry, most of the electronic devices adopt a flat design, and that uses an All-In-One concept to put all the functions into a unit, so that their functions are enhanced, while their sizes are made to be compact. However, the placement seat structure placed at the bottom of the flat panel display still lacks major improvements.

The fact is that, the connection structure and design for the flat panel display and the conventional placement seat is rather complicated. In this conventional design, an inner plate is placed on the back side of the flat panel display, and at least 4 to 6 locking holes are provided on the inner plate. As such, in assembling the placement seat, at least 4 to 6 screw bolts have to be used for fixing, such that the assembly process is time consuming, requiring more material, and the cost is high. In addition, in assembling and detaching the placement seat, screw driver has to be used, that could cause quite inconvenience for the staff of assembly and maintenance.

Moreover, though most of the electronic devices adopt a flat design, yet different cablings are required to use between various different electronic devices. Since in the prior art, the flat panel display and the supporting placement seat are designed and sold together in pairs, such that in case the original flat panel display has to be replaced by a new flat panel display, the original cablings to the placement seat must be detached and rearranged accordingly. In this regard, for the big corporations, government institutions, and super markets, the system updates for quite a lot of the electronic devices can be rather time consuming and inconvenient.

Therefore, presently, the design and performance of a placement seat is not quite satisfactory, and it leaves much room for improvement.

SUMMARY OF THE INVENTION

In view of the problems and drawbacks of the prior art, the present invention provides a fast detachable placement seat structure for a display, that is compact in structure, easy to assemble and detach without the need of using tools, to overcome the deficiency of the conventional placement seat.

In order to achieve the objective mentioned above, the present invention provides a fast detachable placement seat structure for a display, comprising: a flat panel display and a placement seat. The placement seat includes: a support plate, a bottom seat, a cable placement portion, and a fast detachable mechanism. The fast detachable mechanism includes at least a fastening portion, and at least a locking portion. The flat panel display is disposed in an electronic device. The placement seat is disposed below and connected to the flat panel display. Wherein, the bottom base is connected to the support plate to form an angle with the support plate, and is used for receiving circuits, and a cable inlet end is disposed at one side of the bottom base. The cable placement portion is disposed between the support plate and the bottom base. The fast detachable mechanism is disposed on the support plate, and is located between the support plate and a back side of the flat panel display. The at least a fastening portion is formed by at least a recess on the support plate, and at least a pillar on the back side of the flat panel display. The at least a locking portion is formed by at least a through hole on the support plate, and at least a screw hole piece on the back side of the flat panel display, for a screw bolt to insert through the through hole and the screw hole piece, to be locked and fixed in the screw hole piece.

In the descriptions above, the electronic device includes a main body and a flat panel display, and the flat panel display is a liquid crystal display. The electronic device is of a flat type incorporating all functions into a single unit (All-In-One), and that is selected from one of the following group consisting of an industrial control instrument, a man-machine interface, a Point of Sale, a multi-function printer, a vehicle GPS, a communication device, a telephone system, an intelligent household equipment, and a medical care device.

In the descriptions above, the recess is located on the support plate, while the pillar is disposed on a back side of the flat panel display corresponding to the recess.

In the descriptions above, two recesses are disposed respectively on a left side and a right side on an upper rim of the support plate, and two pillars are disposed respectively at a left position and a right position on the back side of the flat panel display, and correspond respectively to the two recesses.

In the descriptions above, the screw hole piece is located on the back side of the flat panel display, and the through hole is located on the support plate of the placement seat corresponding to the screw hole piece, for a screw bolt to insert through the through hole and the screw hole piece, to be locked and fixed in the screw hole piece.

In the descriptions above, the through hole can be in a form of step hole, the screw hole piece is formed by the through hole and a screw hole plate (not shown) outside and inside the back side of the flat panel display respectively, and a screw hole is provided in the center of the screw hole plate. The screw bolt of the locking portion can be a minus screw bolt, a plus screw bolt, or a hand screw bolt, so that screw bolt can be locked and unlocked through using a coin or through rotation by a hand.

In the descriptions above, the pillar of the fastening portion can be a fixed type pillar or a movable type pillar. The fixed type pillar is located directly on the back side of the flat panel display; while the movable type pillar can be fixed onto the screw hole piece on the back side of the flat panel display through using the screw bolt.

In the descriptions above, the fast detachable mechanism can be designed into a reverse configuration. By way of example, the pillar of the fastening portion can be rearranged to dispose on the support plate of the placement seat, while the recess can be rearranged to locate on the back side of the flat panel display. Moreover, the screw hole piece of the locking portion can be rearranged to locate on the support plate of the placement seat, while the through hole can be located correspondingly on the back side of the flat panel display, for the screw bolt to insert through the through hole and the screw hole piece, to be locked and fixed in the screw hole piece. In this approach, the fast detachable placement seat structure for a display can be used to achieve the same effect of the original configuration as mentioned earlier. (Compared with the descriptions in the last three paragraphs above, the descriptions in this paragraph involve only location rearrangements for the related elements, so there is no need to show them in different drawings for brevity).

Compared with the Prior Art, the fast detachable placement seat structure for a display of the present invention is able to achieve fewer components required, compact structure, and convenient assembly/detachment, to reduce production cost significantly, while saving installation and maintenance time. As such, the fast detachable placement seat structure for a display can be utilized in various electronic devices having flat panel displays.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Refer to FIGS. 1-5 respectively for an exploded view of a fast detachable placement seat structure for a display according to the present invention; plan views of a support plate according to the present invention; a perspective view of an assembled fast detachable placement seat structure for a display according to the present invention; a plan view of an assembled fast detachable placement seat structure for a display according to the present invention; and a cross section view of an assembled fast detachable placement seat structure for a display according to the present invention.

Figure 1:
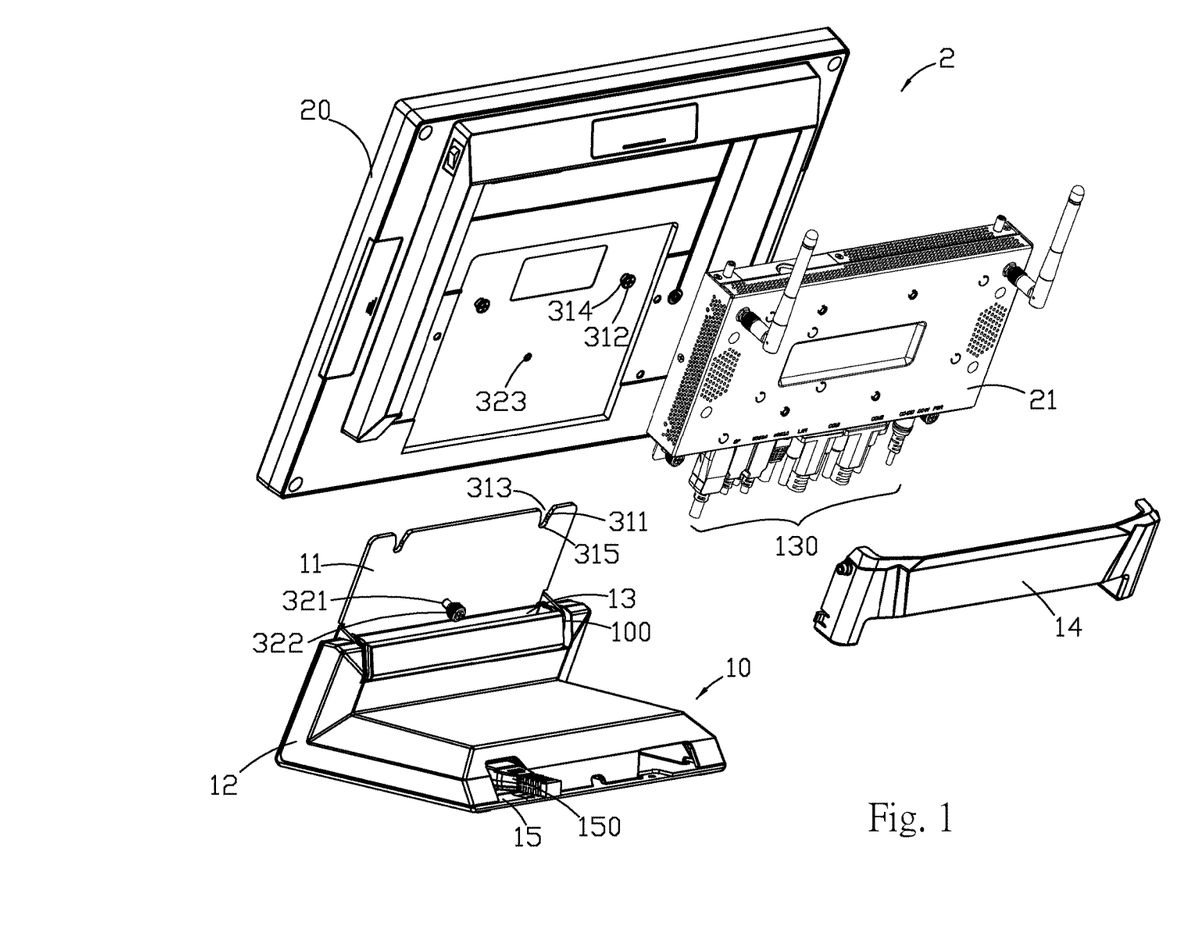
FIG. 1 is an exploded view of a fast detachable placement seat structure for a display according to the present invention.
Figure 2A:
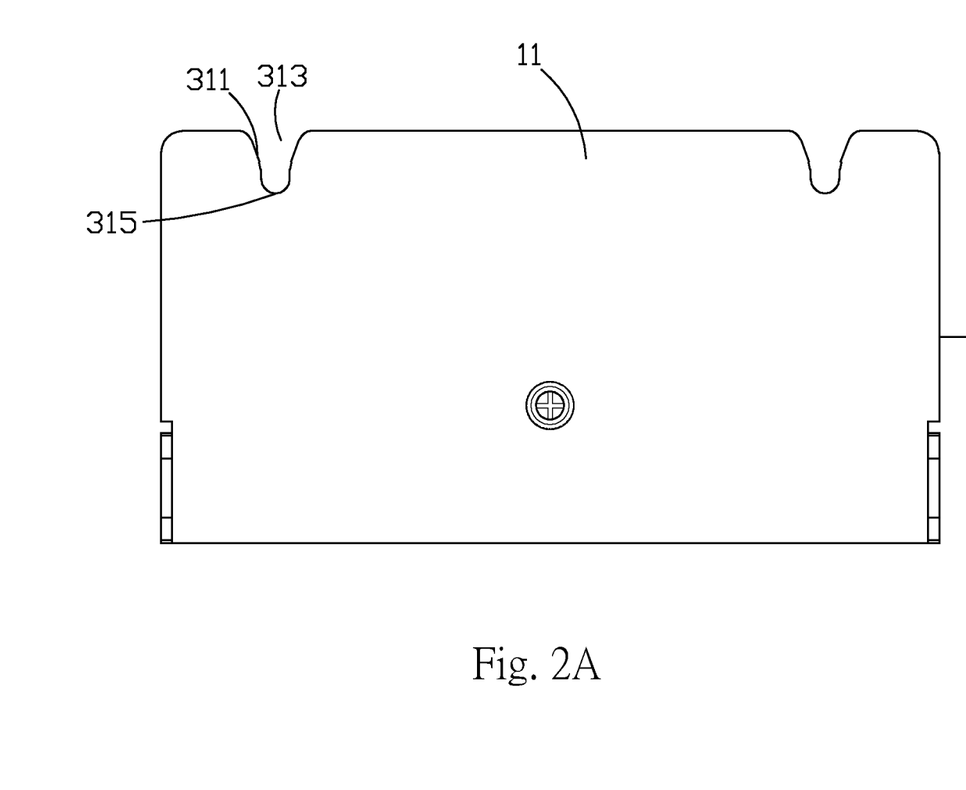
FIGS. 2A and 2B are plan views of a support plate according to the present invention.
Figure 2B:
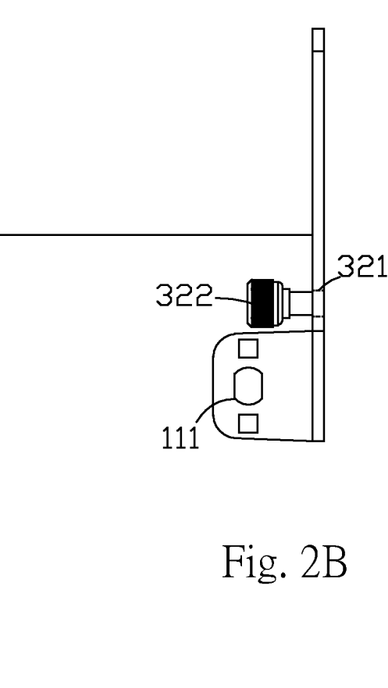
Figure 3:
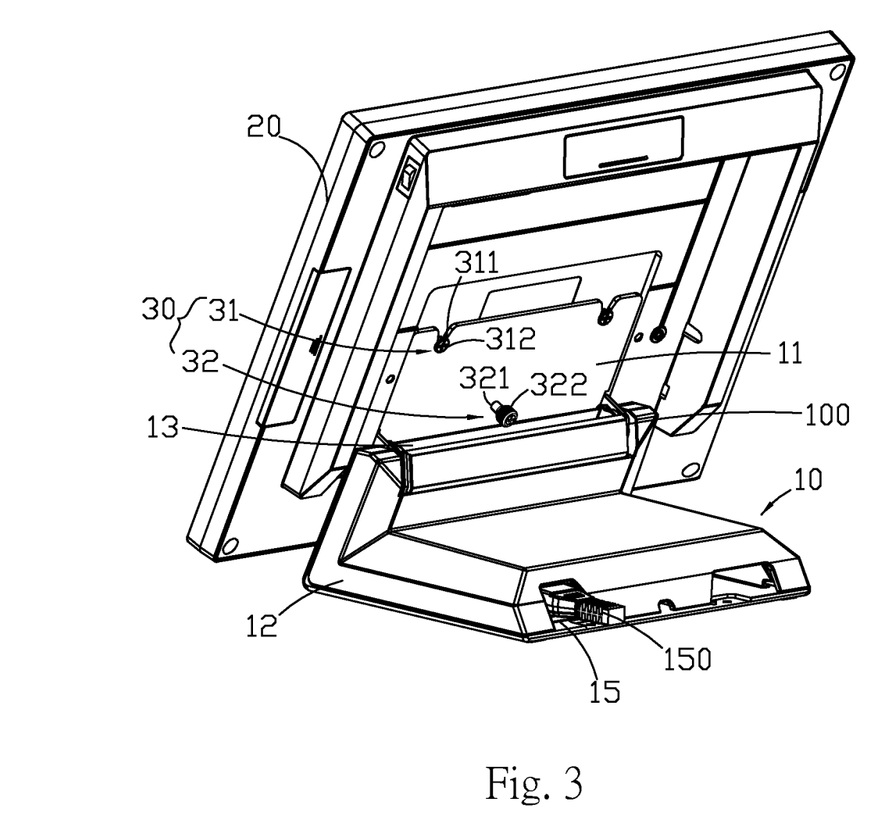
FIG. 3 is a perspective view of an assembled fast detachable placement seat structure for a display according to the present invention.
Figure 4:
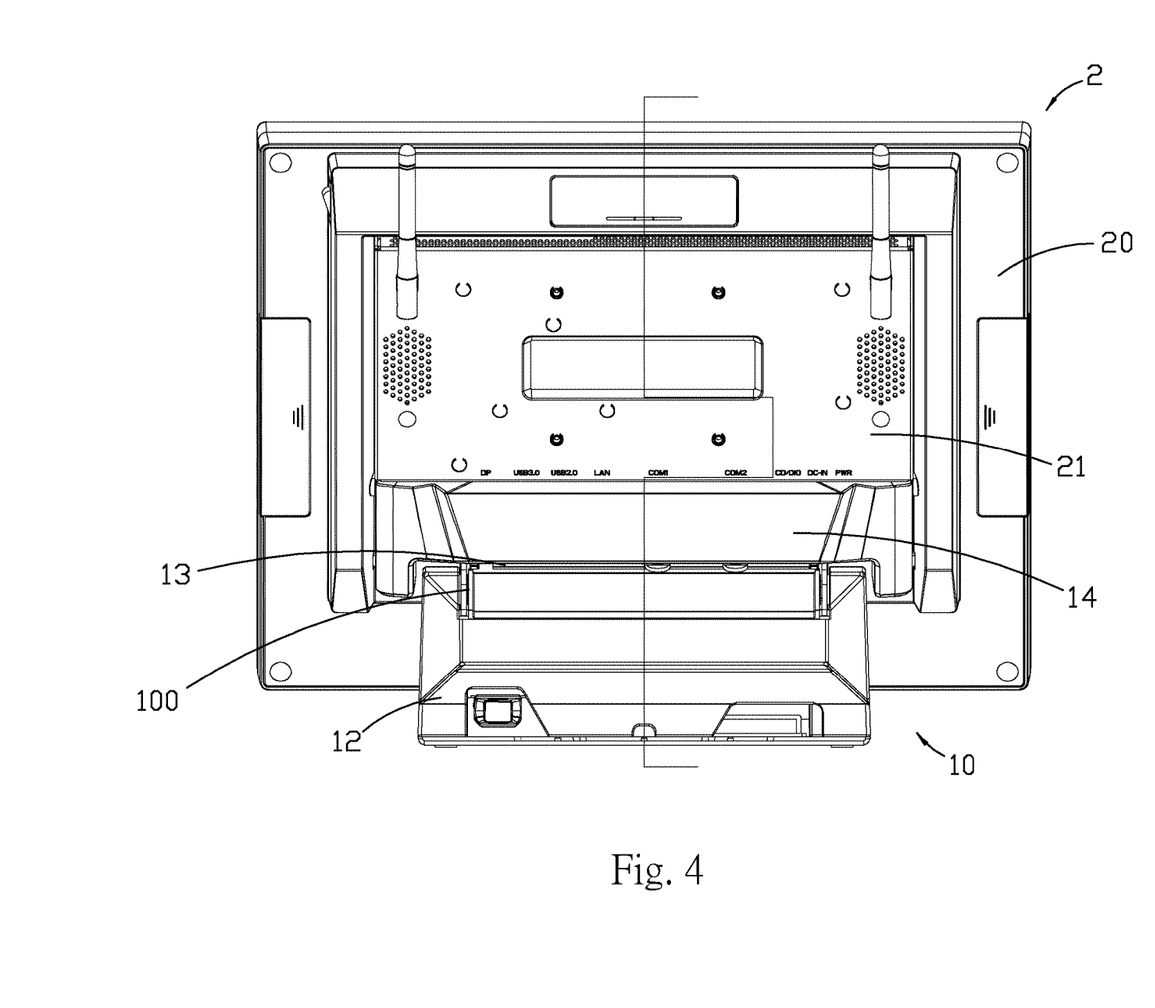
FIG. 4 is a plan view of an assembled fast detachable placement seat structure for a display according to the present invention.
Figure 5:
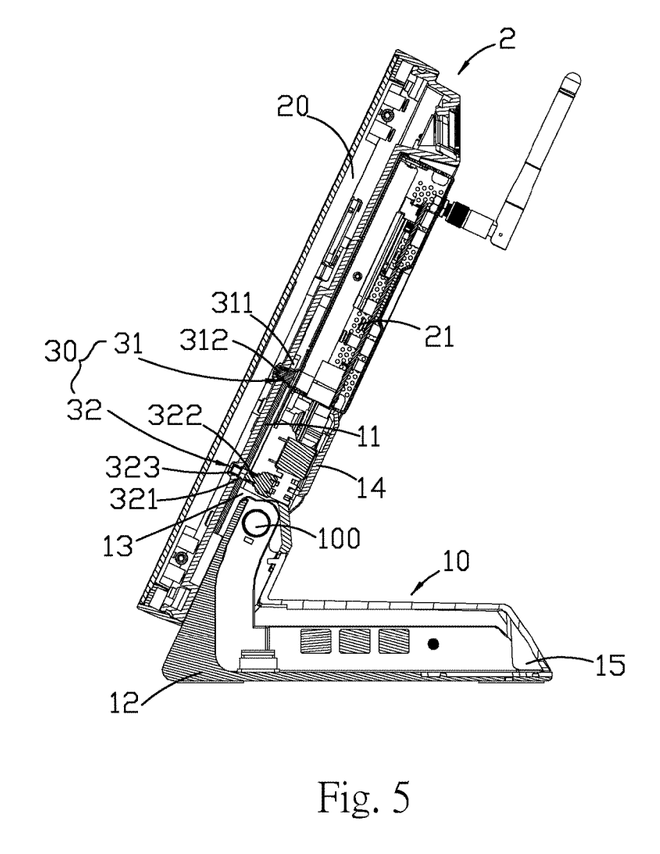
FIG. 5 is a cross section view of an assembled fast detachable placement seat structure for a display according to the present invention.

As shown in FIGS. 1-5, the present invention provides a fast detachable placement seat structure for a display, comprising: a flat panel display 20 and a placement seat 10. The placement seat 10 includes: a support plate 11, a bottom seat 12, a cable placement portion 13, and a fast detachable mechanism 30. The fast detachable mechanism 30 includes at least a fastening portion 31, and at least a locking portion 32 (FIGS. 3 and 5). The flat panel display 20 is disposed in an electronic device 2. The placement seat 10 is disposed below and connected to the flat panel display 20. Wherein, the bottom base 12 is connected to the support plate 11 to form an angle with the support plate 11, and is used for receiving circuits (not shown), and a cable inlet end 15 is disposed at one side of the bottom base 12. The cable placement portion 13 is disposed between the support plate 11 and the bottom base 12. The fast detachable mechanism 30 is disposed on the support plate 11, and is located between the support plate 11 and a back side of the flat panel display 20. The at least a fastening portion 31 is formed by at least a recess 311 on the support plate 11, and at least a pillar 312 on the back side of the flat panel display 20. Wherein, the pillar 312 is of a movable type, and is fixed to the screw hole piece 323 on the back side of the flat panel display 20 through using the screw bolt 322. The at least a locking portion 32 is formed by at least a through hole 321 on the support plate 11, and at least a screw hole piece 323 on the back side of the flat panel display 20, for a screw bolt 322 to insert through the through hole 321 and the screw hole piece 323, to be locked and fixed in the screw hole piece 323. Wherein, the screw bolt 322 is a minus screw bolt, a plus screw bolt, or a hand screw bolt, so that screw bolt 322 can be locked and unlocked through using a coin or through rotation by a hand.

As shown in FIGS. 1,4,5, the flat panel display 20 is a liquid crystal display, the electronic device 2 is of a flat type incorporating all functions into a single unit (All-In-One), and that is selected from one of the following group consisting of an industrial control instrument, a man-machine interface, a Point of Sale, a multi-function printer, a vehicle GPS, a communication device, a telephone system, an intelligent household equipment, and a medical care device.

Figure 6:
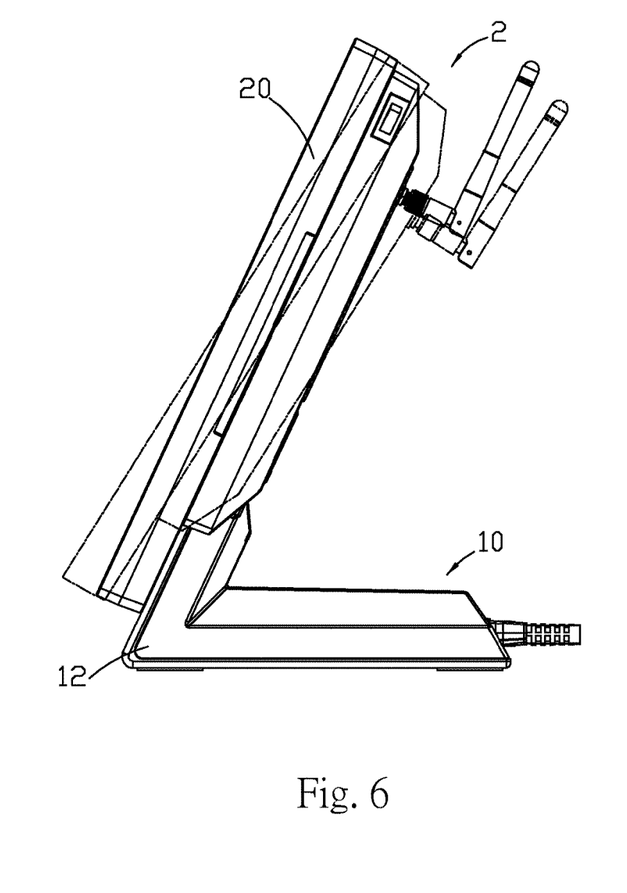
FIG. 6 is a side view of a fast detachable placement seat structure for a display in application according to the present invention.

As shown in FIGS. 1 to 3, two pivot hole plates 111 are disposed respectively on two sides of the support plate 11, and are connected to the bottom base 12 through a hinge 100 disposed in-between, to vary an angle between the support plate 11 and the bottom base 12, to bring the flat panel display 20 installed on the support plate 11 into rotation, to facilitate viewing by a user (as shown in FIG. 6). As such, a cable placement portion 13 is disposed between the support plate 11 and the bottom base 12, to receive a plurality of connection cables 130 connected to a main machine 21. On the rear portion of the cable placement portion 13 is disposed a cable cover 14. The cable inlet end 15 is connected to a power cable 150 or a USB cable (not shown). But, the present invention is not limited to this.

The recesses 311 of the fastening portion 31 are located on the support plate 11 of the placement seat 10; while the pillars 312 are disposed on the back side of the flat panel display 20 corresponding to the recesses 311. The screw hole piece 323 of the locking portion 32 is located on the back side of the flat panel display 20; while the through hole 321 is located on the support plate 11 of the placement seat 10 corresponding to the screw hole piece 323, for the screw bolt 322 to insert through the through hole 321 and the screw hole piece 323, to be locked in the screw hole piece 323, in achieving fixing the flat panel display 20 onto the placement seat 10.

As shown in FIGS. 1 to 5, two V-shape recesses 311 are disposed respectively on a left side and a right side on an upper rim of the support plate 11, and two pillars 312 are disposed respectively at a left position and a right position on the back side of the flat panel display 20, and correspond respectively to the two recesses 311. On an upper end of the recess 311 is provided with an opening 313, and on a lower end of the recess 311 is provided with a U-shape bottom portion 315. An opposite-contact portion 314 is provided at a lower end of a side opposite to the pillar 312. The pillar 312 can be inserted through the opening 313 to act in cooperation with the U-shape bottom portion 315 to achieve close engagement and stable placement. The screw hole piece 323 on the back side of the flat panel display 20 is located just opposite to the through hole 321 on the support plate 11, for the screw bolt 322 to insert through the through hole 321 and the screw hole piece 323, to be locked and fixed in the screw hole piece 323.

As such, the placement seats 10 can be used extensively on the flat panel displays 20 of the various electronic devices 2 through utilizing an All-In-One concept. In assembly, the fast detachable mechanism 30 on the support plate 11 is utilized, so that the pillars 312 on both sides of the flat panel display 20 can be inserted easily into the respective V-shape recesses 311 on both sides of the support plate 11, to achieve close engagement and stable placement. Moreover, the screw hole piece 323 on the back side of the flat panel display 20 is located just opposite to the through hole 321 on the support plate 11, for the screw bolt 322 to insert easily through the through hole 321, to be locked and fixed in the screw hole piece 323. In this approach, the flat panel display 20 can be assembled and fixed to the placement seats 10 quickly without the need of using a screw driver or other tools, in achieving few components required, simple structure, easy assembly/detachment, while reducing the production cost significantly.

Due to the flexible design of the fast detachable mechanism 30, a cable placement portion 13 is formed between the support plate 11 and the bottom base 12, to receive a plurality of connection cables 130 of various types connected to a main body 21; while the cable inlet end 15 of the placement seat 10 is connected to a single power cable 150 or USB cable. As such, in case the electronic device 2 has to be replaced or repaired, the main machine 21 and flat panel display 20 can be replaced easily and quickly, to save the time and efforts for assembly and repair.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A fast detachable placement seat structure for a display, comprising:
    a flat panel display, disposed in an electronic device; and
    a placement seat, disposed below and connected to the flat panel display,
    the placement seat includes:
        a support plate,
        a bottom base, connected to the support plate to form an angle with the support plate, and is used for receiving circuits, and a cable inlet end is disposed on one side of the bottom base,
        a cable placement portion, disposed between the support plate and the bottom base, and
        a fast detachable mechanism, disposed on the support plate, and is located between the support plate and a back side of the flat panel display, the fast detachable institution includes:
            at least a fastening portion, formed by at least a recess on the support plate, and at least a pillar on the back side of the flat panel display, and
            at least a locking portion, formed by at least a through hole on the support plate, and at least a screw hole piece on the back side of the flat panel display, for a screw bolt to insert through the through hole and the screw hole piece, to be locked and fixed in the screw hole piece.

2. The fast detachable placement seat structure for a display as claimed in claim 1, wherein the flat panel display is a liquid crystal display, the electronic device is of a flat type incorporating all functions into a single unit (All-In-One), and that is selected from one of the following group consisting of an industrial control instrument, a man-machine interface, a Point of Sale, a multi-function printer, a vehicle GPS, a communication device, a telephone system, an intelligent household equipment, and a medical care device.

3. The fast detachable placement seat structure for a display as claimed in claim 2, wherein the recess of the fastening portion is disposed on the support plate of the placement seat, the pillar is disposed on the back side of the flat panel display corresponding to the recess, the screw hole piece of the locking portion is located on the back side of the flat panel display, the through hole is located on the support plate of the placement seat, for the screw bolt to insert through the through hole and the screw hole piece, to be locked and fixed in the screw hole piece.

4. The fast detachable placement seat structure for a display as claimed in claim 3, wherein two recesses are disposed respectively on a left side and a right side on an upper rim of the support plate, and two pillars are disposed respectively at a left position and a right position on the back side of the flat panel display, and correspond respectively to the two recesses, each of the two recesses is of a V-shape, on an upper end of the recess is provided with an opening, and on a lower end of the recess is provided with a U-shape bottom portion, an opposite-contact portion is provided at a lower end of a side opposite to the pillar, to act in cooperation with the U-shape bottom portion to achieve stable placement, the screw hole piece on the back side of the flat panel display is located just opposite to the through hole on the support plate for the screw bolt to insert through the through hole and the screw hole piece, to be locked and fixed in the screw hole piece.

5. The fast detachable placement seat structure for a display as claimed in claim 4, wherein the through hole is a step hole, and the screw hole piece on the back side of the flat panel display is formed by the through hole and a screw hole plate outside and inside the back side of the flat panel display respectively, and a screw hole is provided on the screw hole plate.

6. The fast detachable placement seat structure for a display as claimed in claim 4, wherein the cable inlet end is connected to a single power cable or a USB cable, two pivot hole plates are disposed respectively on both sides of the support plate, and are connected to the bottom base through a hinge disposed in-between, to vary an angle between the support plate and the bottom base, the cable placement portion is formed between the support plate and the bottom base, to receive a plurality of cables connected to a main machine, and a cable cover is provided at a rear portion of the cable placement portion.

7. The fast detachable placement seat structure for a display as claimed in claim 4, wherein the pillar of the fastening portion is a fixed type pillar or a movable type pillar, the fixed type pillar is connected directly to the back side of the flat panel display, the movable type pillar is fixed to the screw hole piece on the back side of the flat panel display through using the screw bolt.

8. The fast detachable placement seat structure for a display as claimed in claim 4, wherein the screw bolt of the locking portion is one of the following: a minus screw bolt, a plus screw bolt, and a hand screw bolt.

9. The fast detachable placement seat structure for a display as claimed in claim 2, wherein the pillar of the fastening portion is disposed on the support plate of the placement seat, and the recess is located on the back side of the flat panel display corresponding to the pillar, wherein the screw hole piece of the locking portion is located on the support plate of the placement seat, the through hole is located on the back side of the flat panel display corresponding to screw hole piece, for the screw bolt to insert through the through hole and the screw hole piece, to be locked and fixed in the screw hole piece.

\* \* \* \* \*